(12) United States Patent
Kelders

(10) Patent No.: US 6,423,122 B1
(45) Date of Patent: Jul. 23, 2002

(54) ABSORPTION DEVICE AND CORRESPONDING EXCHANGEABLE PACKAGING

(75) Inventor: Johannes Hubertus Josef Maria Kelders, Drunen (NL)

(73) Assignee: Henkel KGaA (DE)

( * ) Notice: Subject to any disclaimer, the term of this patent is extended or adjusted under 35 U.S.C. 154(b) by 0 days.

(21) Appl. No.: 09/486,406

(22) PCT Filed: Aug. 26, 1998

(86) PCT No.: PCT/EP98/05500

§ 371 (c)(1),
(2), (4) Date: May 18, 2000

(87) PCT Pub. No.: WO99/10083

PCT Pub. Date: Mar. 4, 1999

(30) Foreign Application Priority Data

Aug. 27, 1997 (NL) .............................................. 1006852

(51) Int. Cl.⁷ .............................................. B01D 53/26
(52) U.S. Cl. .............................. 96/119; 96/147; 55/429; 206/204
(58) Field of Search ........................ 96/119, 147, 151, 96/396; 55/374, 376, 378, 429, 508, 515; 206/204

(56) References Cited

U.S. PATENT DOCUMENTS

| | | | |
|---|---|---|---|
| 913,325 A | * | 2/1909 | Touzimsky |
| 2,036,909 A | * | 4/1936 | Baker |
| 2,341,893 A | | 2/1944 | Baker .......................... 183/4.4 |
| 2,548,335 A | * | 4/1951 | Balogh |
| 2,693,864 A | * | 11/1954 | Ferro |
| 3,959,137 A | * | 5/1976 | Kirsgalvis ................... 210/232 |
| 5,148,613 A | * | 9/1992 | Cullen |
| 5,215,561 A | * | 6/1993 | Cameron |
| 5,443,626 A | | 8/1995 | Kiyani ......................... 96/108 |
| 5,768,734 A | * | 6/1998 | Dietrich ...................... 210/169 |
| 6,273,942 B1 | * | 8/2001 | Jersby .......................... 96/118 |

FOREIGN PATENT DOCUMENTS

| | | |
|---|---|---|
| EP | 0212029 | 3/1987 |
| FR | 2234029 | 1/1975 |
| FR | 2750618 | 1/1998 |
| GB | 2067428 | 7/1981 |

* cited by examiner

Primary Examiner—Duane Smith
Assistant Examiner—Frank M. Lawrence
(74) Attorney, Agent, or Firm—Webb Ziesenheim Logsdon Orkin & Hanson, P.C.

(57) ABSTRACT

A device is disclosed for absorbing moisture from the air. The device is made of flexible packaging material attached to a support. The packaging is filled with an absorption material. The support may have parts for holding the same in a rigid standard size holding device and/or parts for suspension. The packaging can be separately joined e.g. cramped to the support. A receptacle for collecting the moisture can be provided on the underside of the packaging. The receptacle can also be made of flexible material. The invention also relates to a support and a packaging which are used in such an absorption device.

9 Claims, 6 Drawing Sheets

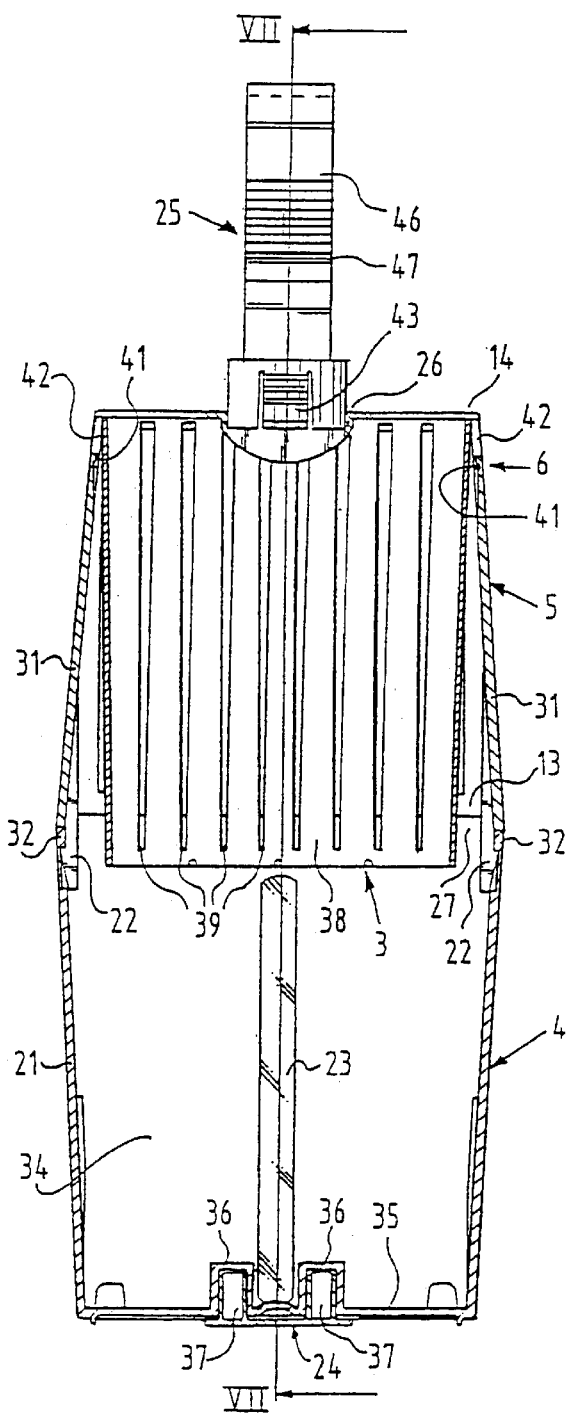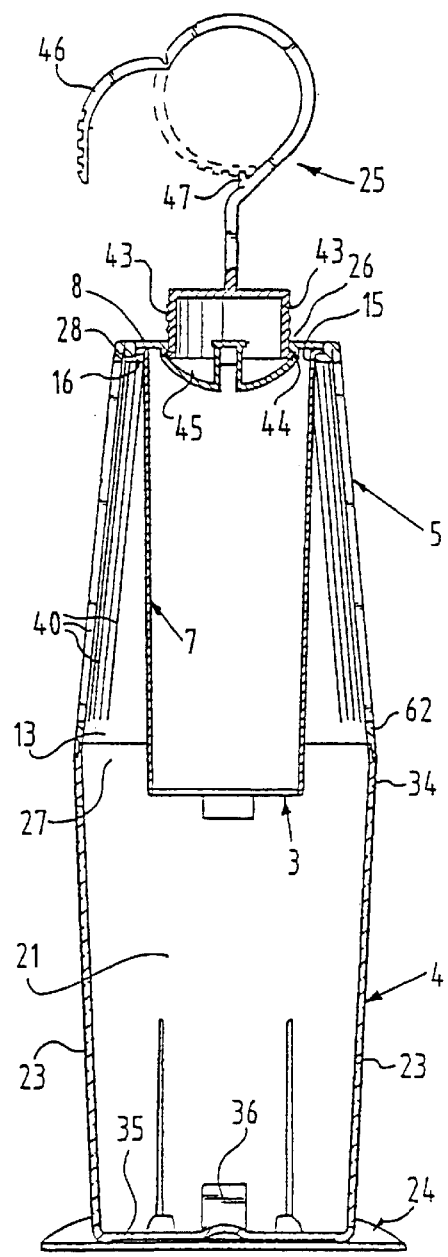
FIG. 6
PRIOR ART
FIG. 7
PRIOR ART

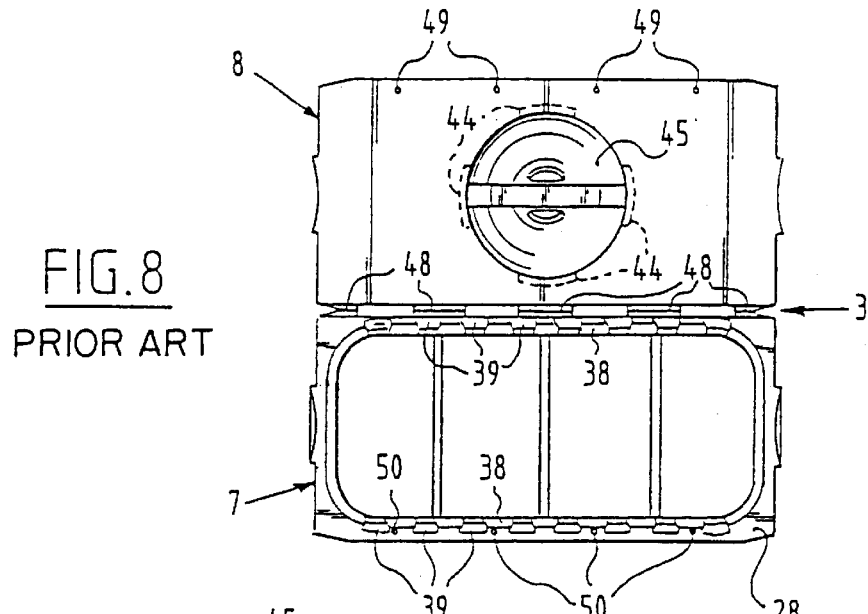
FIG. 8
PRIOR ART
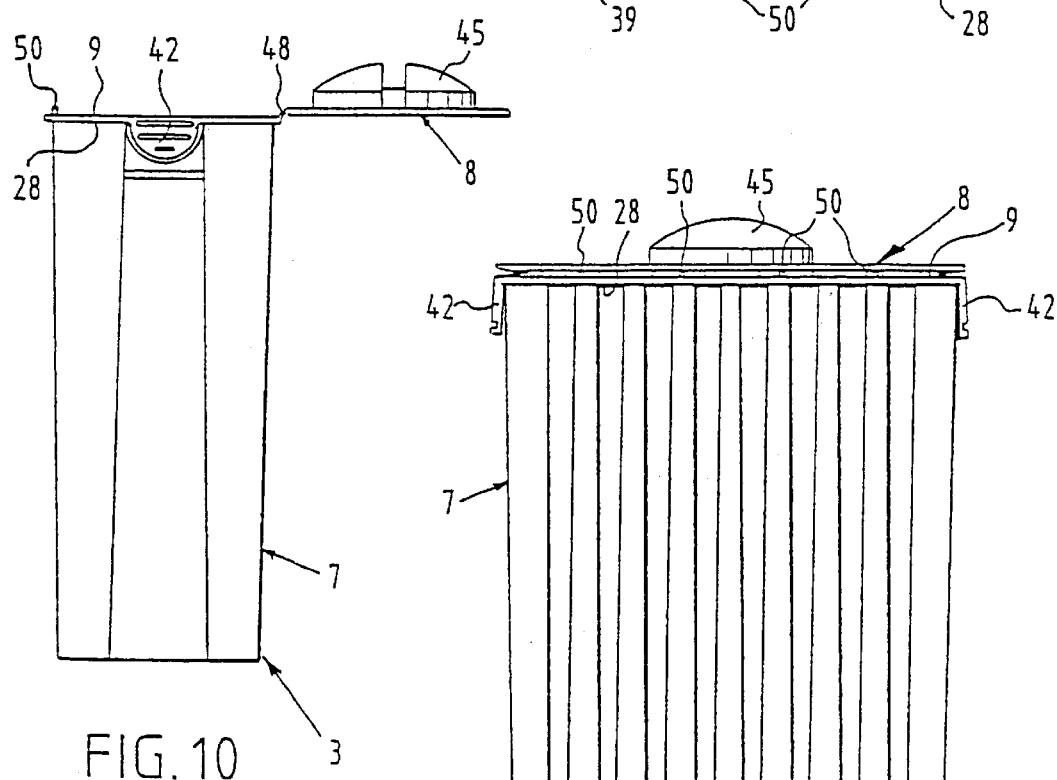
FIG. 10
PRIOR ART
FIG. 9
PRIOR ART

ABSORPTION DEVICE AND CORRESPONDING EXCHANGEABLE PACKAGING

This application is a 371 of PCT application No. PCT/EP98/05500, filed on Aug. 26, 1998.

BACKGROUND OF THE INVENTION

1. Field of the Invention

The present invention relates to a device for absorbing moisture from the air.

2. Description of the Prior Art

A known device for absorbing moisture from the air includes a form-retaining housing manufactured from plastic and consisting of two parts connected releasably to each other. The upper part of the housing herein forms a receptacle part intended for receiving one or more cassettes filled with an absorbent material. The lower part of the housing forms a collecting part in which the moisture collects which is extracted from the air by the absorbent material in the cassettes. The cassettes with the absorbent material can have a fixed, standardized size whereby they are easily exchangeable between many different types of absorption devices.

The known absorption device has the drawback that it requires a relatively large amount of material. The device is thereby relatively expensive and, furthermore, there remains much waste when the device is scrapped. The cassettes used in the known device also represent a relatively large quantity of plastic material, and therefore a high value. This is a particular drawback because these cassettes are replaced after the absorbent material present therein is no longer active. While the cassettes can be embodied such that they can be opened and refilled with absorbent material, this is relatively labour-intensive.

SUMMARY OF THE INVENTION

The invention therefore has for its object to provide an absorption device of the above described type wherein the stated drawbacks do not occur. This is achieved according to the invention with an absorption device which is provided with at least one support and at least one flexible packing connected thereto and filled with absorbent material. By making use of a flexible packing for the absorbent material, for instance a bag, the material consumption associated therewith is low.

The support preferably has means for accommodation thereof in a form-retaining container of standardized dimensions. In this way the absorption device according to the invention can also be used instead of a conventional exchangeable cassette.

When the support has means for suspending thereof, for instance in the form of a hook releasably connected to a bottom of the support, the absorption device can be used independently without the housing of the classic absorption device. The device can then be suspended for instance in a wardrobe.

In preference the or each packing is releasably connected to the support so that it can be easily replaced when the absorbent material arranged therein is no longer active. The support can for instance have means for clamping thereon of the or each packing.

A robust and easily releasable embodiment of the support is obtained when the clamping means comprise at least one, but preferably two, wings connected hingedly to the bottom of the support.

In order to enable use of the absorption device without a separate collecting vessel placed thereunder, it preferably has at least one reservoir for collecting moisture connected on the underside to the or each packing. The or each collecting reservoir can herein be manufactured from a flexible material, for instance in that it is manufactured integrally with the or each packing.

The invention also relates to the support and packing for use in the above described absorption device.

BRIEF DESCRIPTION OF THE DRAWING

The invention will now be elucidated on the basis of a number of embodiments, wherein reference is made to the annexed drawing, in which:

FIG. 3 is a side view of the collecting part of the absorption device shown in FIGS. 1 and 2, FIG. 5 is a front view of the holding means of this device, FIG. 6 shows a longitudinal section through a second embodiment of the conventional absorption device, FIG. 7 shows a cross-section through this device along the line VII—VII in FIG. 6, FIG. 8 is a top view of a conventional exchangeable packing for the absorption device of FIGS. 1–7, FIGS. 9 and 10 show respectively a front view and a side view of the packing depicted in FIG. 8.

Description of the Preferred Embodiments

Figure 1:
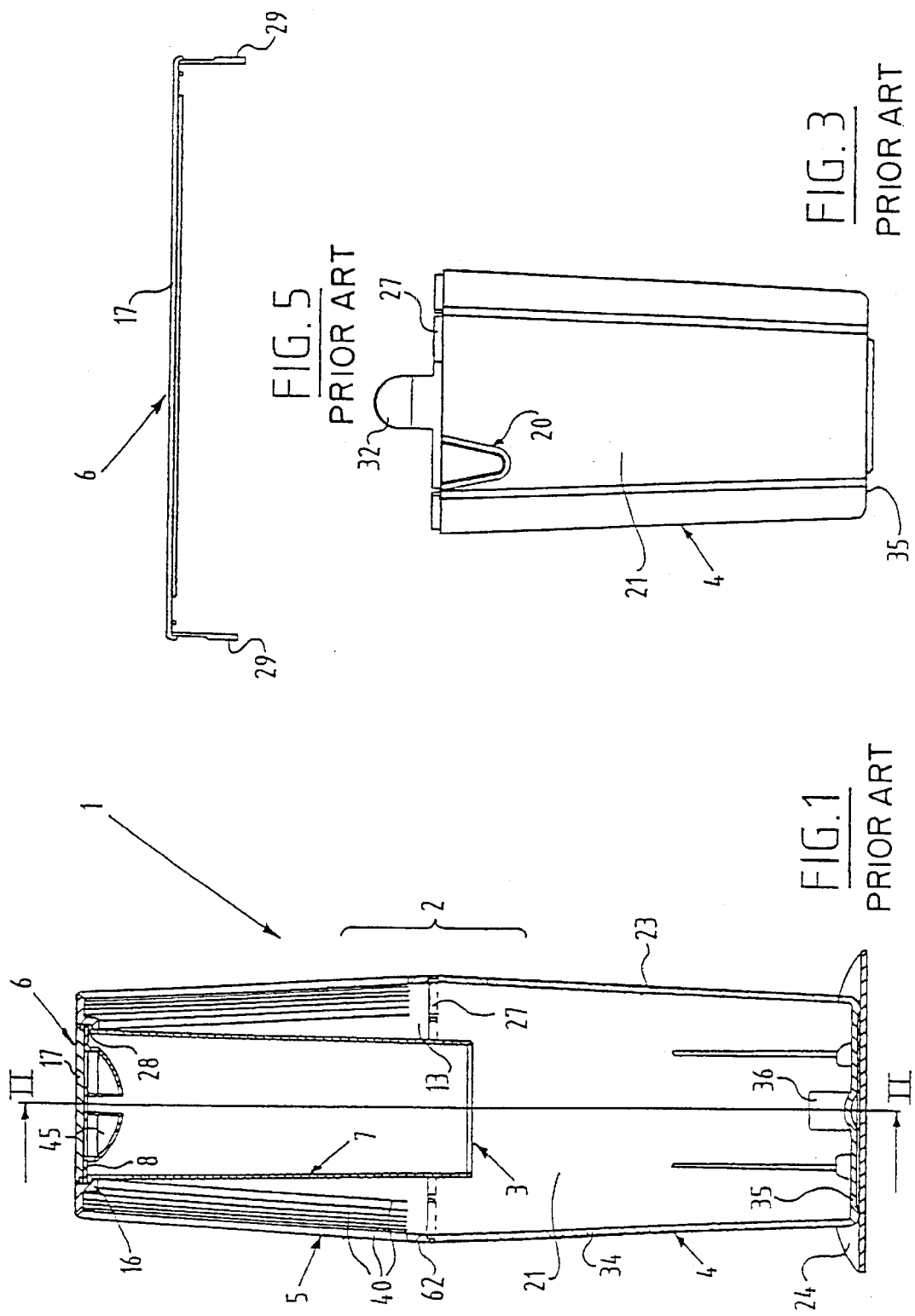
FIG. 1 shows a cross-section through a first embodiment of a conventional absorption device.

A conventional absorption device 1 (FIG. 1) has a container 2 in which is arranged an exchangeable cassette 3. Container 2 is formed by a collecting part 4 and a receptacle part 5 which is placed thereon and which actually accommodates cassette 3 and secures it using holding means 6. Collecting part 4 is intended to collect moisture or water which is removed from the air by the absorbent material present in cassette 3. The collecting part therefore has in one of its side walls 34 a transparent part 23 through which it is possible to observe whether liquid is already present therein, and is further provided with discharge means in the form of a pouring spout 20 arranged in the vicinity of upper edge 27 in a side wall 21 of collecting vessel 4. In order to enable rigid placing of absorption device 1 on a ground despite its relatively high and slim shape without the risk of the device tipping over and the moisture collected therein draining away, it is provided on its underside with a detachable foot 24 which extends in transverse direction of absorption device 1 and protrudes outside it on either side. This foot 24 is provided with a number of pins 37 which are received in recesses 36 in the base 35 of collecting part 4.

Receptacle part 5 is connected releasably to collecting part 4. In the shown embodiment the receptacle part 5 is provided for this purpose in the proximity of its underside 13 with two apertures 33 in the transverse edges 31 thereof. Into these apertures engage resiliently flexible hooking arms 32 which are arranged on the upper edge 27 of collecting part 4. In order to allow the moisture-containing air to come into contact with the absorbent material in cassettes 3 the receptacle part 5 is provided in its long walls 62 with a large number of slit-like apertures 40. Each cassette 3 is also provided in its long side walls 38 with slit-like apertures 39 through which the moist air can penetrate into cassette 3 and come into contact with the absorbent material present therein.

For arranging of the cassettes 3 the receptacle part 5 is provided on its side 14 remote from collecting part 4 with an opening 15, the form and dimensions of which are chosen in the shown embodiment such that two cassettes 3 can be accommodated adjacently of each other in longitudinal direction. These cassettes 3 herein rest with their protruding peripheral edge 28 on the peripheral edge 16 of receptacle part 5 protruding in opening 15. Cassettes 3 are fixed in receptacle part 5 by holding means 6. In the shown embodiment these holding means 6 are formed by a locking member 17 which extends over the whole receiving opening 15 and is provided on its outer ends with resiliently flexible hooking arms 29 (FIG. 5). These hooking arms 29 can engage in apertures 30 on the top part of receptacle part S. Both cassettes 3 are thus fixedly clamped between the edge 16 of receptacle part 5 and locking member 17. In this embodiment of absorption device 1 it would otherwise also be possible to suffice with a single cassette 3 when for instance the air is temporarily relatively dry. This could also be held properly in place by locking member 17.

When only a single cassette with absorbent material is used, it is also possible however to apply therefor a different embodiment of the conventional absorption device 1 (FIG. 6), whereof the form and dimensions of the receiving opening 15 in receptacle part 5 are exactly adapted to a single cassette 3. No use is herein made of a separate locking member to secure the cassette 3 in receptacle part 5 but receptacle part 5 is instead provided in its short sides with hooking edges 41 behind which a resiliently flexible hook member 42 of cassette 3 can be clamped in each case. Although in the shown embodiment this smaller absorption device 1 is likewise provided with a foot 24, it is also suitable for suspending, for instance in a wardrobe where clothing is stored. A detachable hook 25 is arranged for this purpose on the top of device 1. In the shown embodiment this hook is connected to the top part 26 of cassette 3, which is connected in turn to the top side 14 of receptacle part 5 which in its turn is connected to collecting part 4. For this latter connection use is made in the shown embodiment of hooking arms 22 on the underside of receptacle part 5 which engage under hooking edges 32 of collecting part 4. Hook 25 is clamped fixedly in a recess 45 in cover 8 of cassette 3 by means of resiliently flexible hooking arms 43 which engage behind hooking edges 44 of the recess. In the shown embodiment the hook 25 is a closed hook with a hinged closing part 46 which can engage behind a closing edge 47. The suspended absorption device 1, in which a relatively large amount of liquid will accumulate in the course of time, is in this way prevented from coming loose and falling.

The conventional cassette 3 applied in the embodiments of the classic absorption device 1 shown heretofore is form-retaining with a body 7 which is open at the top 9 and closed by a cover 8. Cover 8 is connected to body 7 by means of hinges 48. The absorbent material can be received in body 7 which, as stated, is provided with slit-like apertures 39 for admitting moist air. After filling of the body 7 the cover 8 can herein be snapped fixedly thereon so that it is easy to re-open at a later stage and-the absorbent material can thus be replaced, although the shown embodiment provides for cover 8 to be welded on container body 7 after filling thereof. Arranged for this purpose in cover 8 are a number of orifices 49 which, when cover 8 is closed, drop over pins 50 arranged on the edge 28 of container body 7. By then briefly heating the protruding parts of these pins 50 the cover 8 is welded onto container body 7.

Although the above described variants of the conventional absorption device and the cassettes used therein are very satisfactory in practice, they require a relatively large amount of material, so that they are also quite costly. The invention therefore proposes an absorption device which can not only be used independently but which can also serve as replacement for the conventional exchangeable cassette filled with absorbent material for the conventional form-retaining plastic absorption devices.

Figure 11:
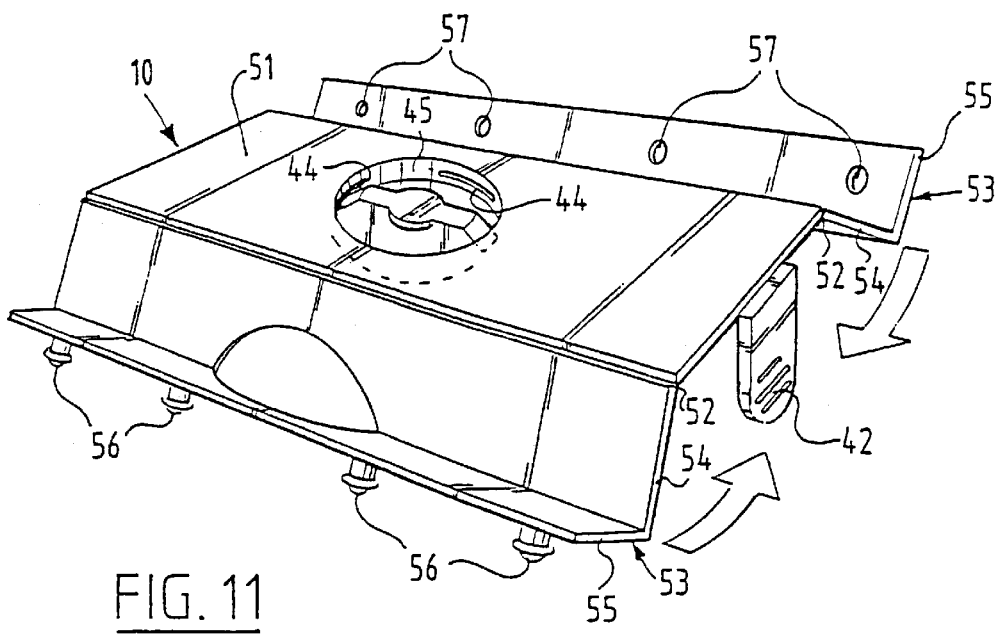
FIG. 11 is a perspective view of a support of the absorption device according to the invention before use thereof.

The absorption device 1 according to the present invention is characterized for this purpose by its flexible character. The device comprises a support 10 and, connected thereto, a flexible packing 11 in which the absorbent material is arranged. The flexible packing 11 is herein suspended from support 10 (FIG. 11). In the shown embodiment the support 10 consists of a bridge piece 51, the form and dimensions of which correspond with the (standardized) form and dimensions of the form-retaining cassette 3 shown above. The absorption device according to the invention can hereby be used to replace such a cassette in a conventional absorption device.

Bridge piece 51 is provided with means for fixedly clamping the flexible packing 11 thereon. These clamping means are formed in the shown embodiment by clamping wings 53 which are arranged on the long sides of the bridge piece and which are connected thereto by means of hinges 52. Each wing 53 is embodied in an L-shape and has a leg, the width of which amounts practically to half the width of bridge piece 51, and an end flange 55 arranged transversely thereof. One of the end flanges 55 is herein provided with protruding pins 56, while the other flange 55 has apertures 57 corresponding therewith. By now holding the flexible packing 11 between wings 53 and subsequently moving the wings towards each other until the pins 56 snap fixedly into apertures 57, the flexible packing 11 is fixed to support 10. Packing 11 is thus connected releasably to support 10 and can be exchanged when the absorbent material arranged therein is no longer active. The quantity of waste packing material generated herein is then minimal. Packing 11 can however also be fixed permanently to support 10, for instance by welding, whereby support 10 with packing 11 has to be replaced integrally.

Figure 2:
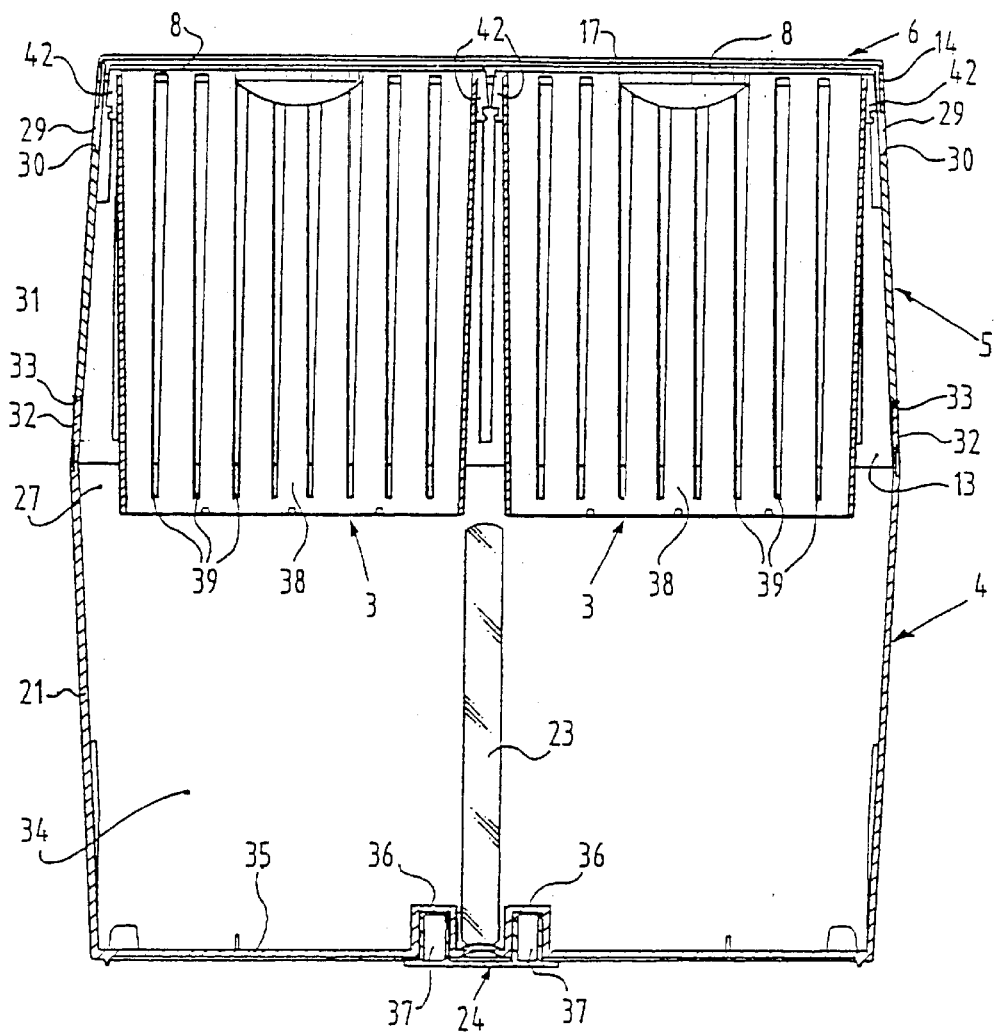
FIG. 2 shows a longitudinal section along the line II—II in FIG. 1.
Figure 4:
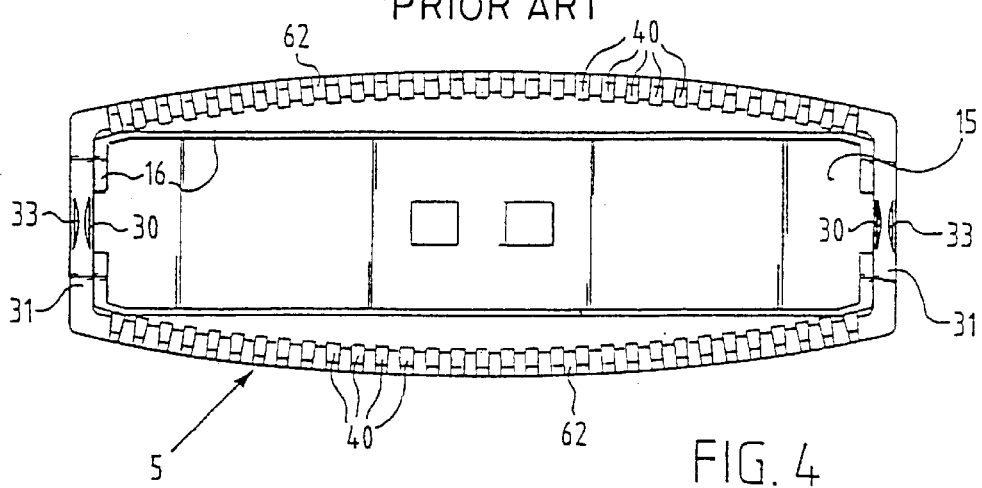
FIG. 4 is a top view of the receptacle part of this absorption device.

After packing 11 has been suspended from support 10 by means of the resilient hooking arms 42, support 10 can be snapped fixedly into the conventional absorption device as shown in FIGS. 6 and 7 or be suspended in the conventional absorption device of FIGS. 1 and 2 and fixed therein by locking member 17. An outer packaging 58 must herein also be removed before use of the packing 3, which packaging serves to prevent the absorbent material in packing 3 already becoming active during transport and storage thereof and thus being practically inactive by the time packing 3 reaches the end-user.

Support 10 can likewise be provided with a recessed part 45 with hooking edges 44 whereby absorption device 1 can likewise be connected on its top 26 to a suspension hook 25

Figure 12:
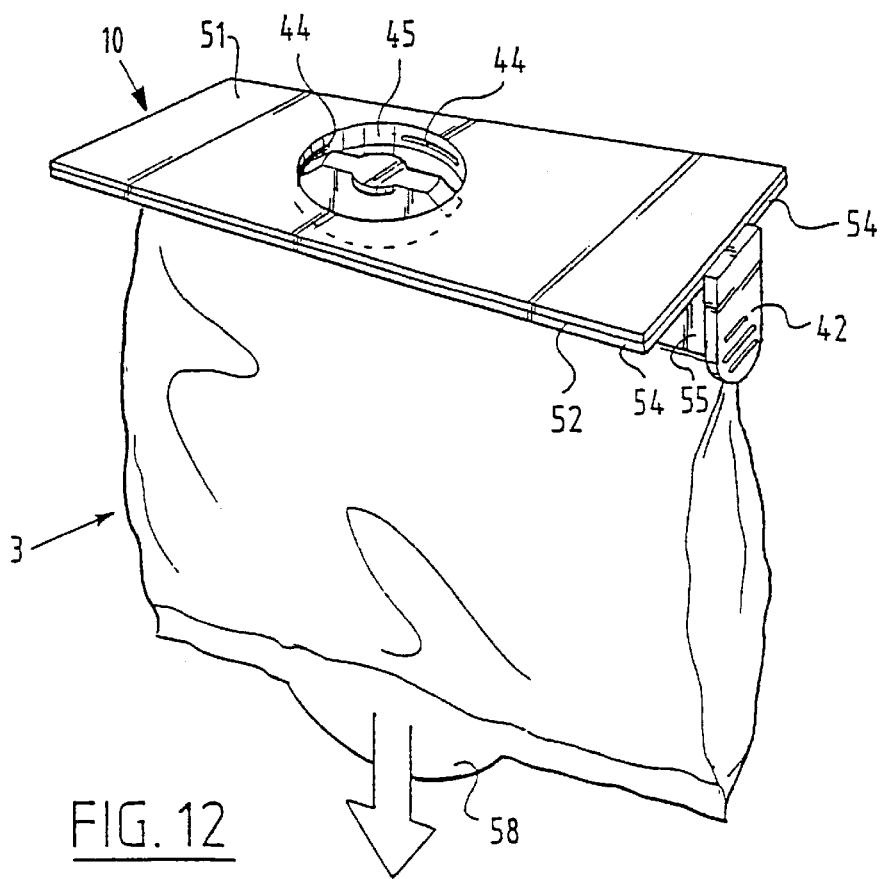
FIG. 12 is a perspective view of a first embodiment of the absorption device according to the invention formed by the support of FIG. 11 and a flexible packing suspended therefrom.
Figure 13:
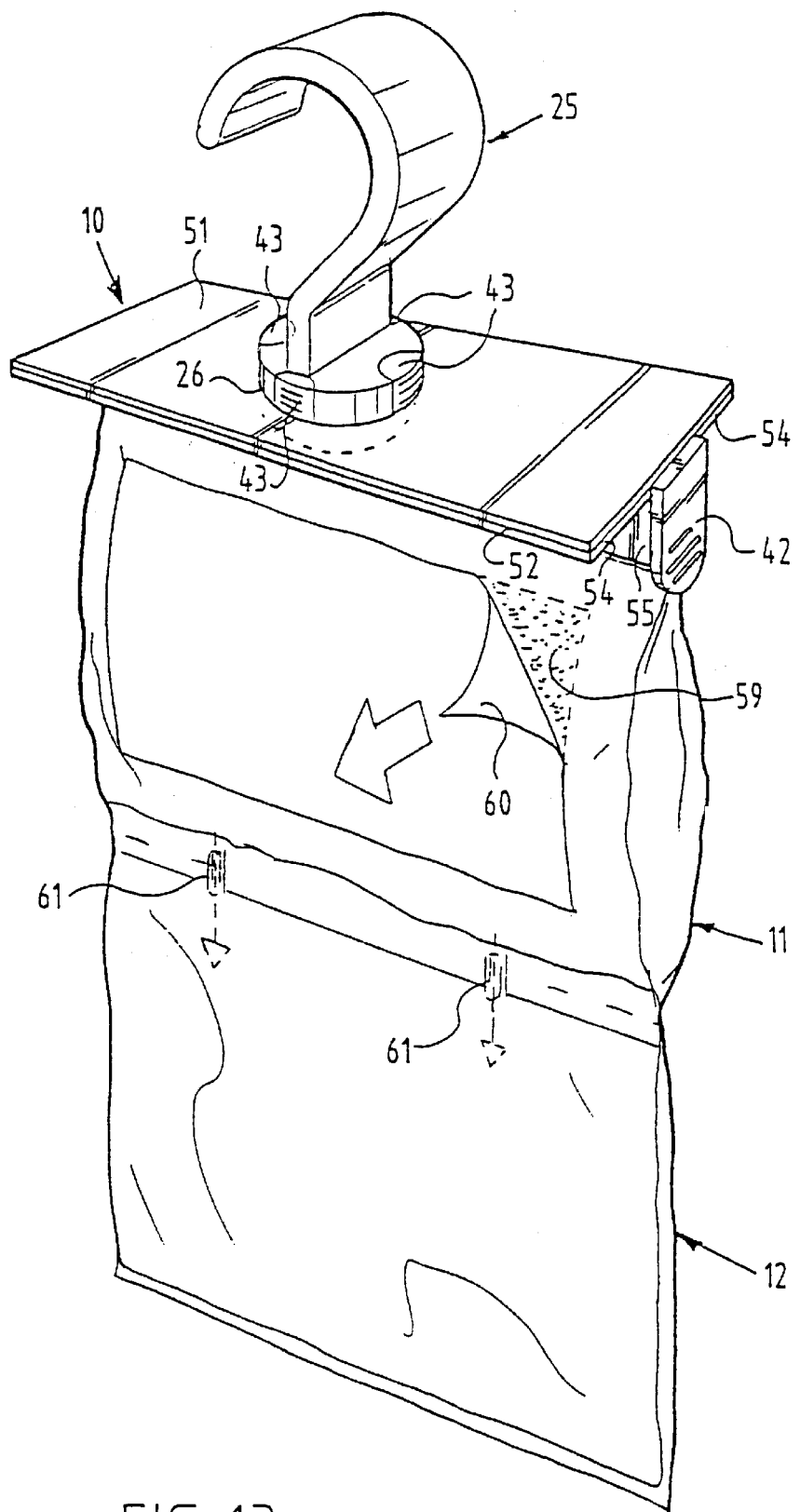
FIG. 13 shows a second embodiment of the absorption device according to the invention provided with a suspension hook and a collecting reservoir.

(FIG. 13). Absorption device 1 can in this manner also be used without the container 2. In this case a collecting reservoir 12 for water formed integrally with the flexible packing 11 can further be arranged on the underside thereof, which reservoir is in communication with the flexible packing 11 via apertures 61 on the underside thereof. This prevents a separate collecting vessel having to be placed under the device. Instead of outer packaging 58 of FIG. 12, the flexible packing 11 can herein be provided with a detachable foil 60 covering an air-permeable part 59 of packing 11. This foil 60 can be removed prior to use, whereafter the flexible packing 11 filled with absorbent material and the collecting reservoir 12 arranged thereunder form in combination with support 10 a complete absorption device.

Although the invention is elucidated above on the basis of a number of embodiments, it will be apparent to the skilled person that it is not limited thereto. The scope of the invention is defined solely by the following claims.

What is claimed is:

1. An absorption device for absorbing moisture from the air, comprising at least one support and at least one flexible packing connected thereto and filled with an absorbent material, wherein the support has clamping means for releasably connecting the at least one flexible packing to the support and wherein the clamping means includes at least one wing connected hingedly to the bottom of the support.

2. The absorption device as claimed in claim 1, wherein two clamping wings are arranged for mutual connection on either side of the bottom.

3. The absorption device as claimed in claim 1, wherein the support has means for accommodation thereof in a form-retaining container of standardized dimensions.

4. The absorption device as claimed in claim 1, wherein the support has means for the suspending thereof.

5. The absorption device as claimed in claim 4, wherein the suspending means includes at least one hook releasably connected to a bottom of the support.

6. The absorption device as claimed claim 1, further including at least one reservoir for collecting moisture connected to the underside of each flexible packing.

7. The absorption device as claimed in claim 6, wherein the at least one collecting reservoir is manufactured from a flexible material.

8. The absorption device as claimed in claim 6, wherein the at least one collecting reservoir is integral with the associated flexible packing.

9. The absorption device as claimed in claim 7, wherein the at least one collecting reservoir is integral with the associated flexible packing.

* * * * *

UNITED STATES PATENT AND TRADEMARK OFFICE
CERTIFICATE OF CORRECTION

PATENT NO.    : 6,423,122 B1
DATED         : July 23, 2002
INVENTOR(S)   : Johannes H.J.M. Kelders It is certified that error appears in the above-identified patent and that said Letters Patent is hereby corrected as shown below:

Column 2,
Line 11, "DRAWING" should read -- DRAWINGS --.
Line 44, "Description of the Preferred Embodiments" should read -- DESCRIPTION OF THE PREFERRED EMBODIMENTS --.

Column 3,
Line 26, "part S" should read -- part 5 --.

Column 4,
Line 3, "and-the" should read -- and the --.

Signed and Sealed this

Twenty-sixth Day of November, 2002

Attest:

Attesting Officer

JAMES E. ROGAN
Director of the United States Patent and Trademark Office